United States Patent [19]

Ishii et al.

[11] 4,225,379
[45] Sep. 30, 1980

[54] METHOD OF LAMINATING PLASTIC FILM AND SHAPED METAL SUBSTRATES

[75] Inventors: Tsuneji Ishii; Tetsuro Tsukada; Takeshi Abe; Tsutomu Koyama, all of Yokohama, Japan

[73] Assignee: Asahi Glass Company, Limited, Tokyo, Japan

[21] Appl. No.: 856,100

[22] Filed: Nov. 30, 1977

[30] Foreign Application Priority Data

Dec. 13, 1976 [JP] Japan ............................ 51-148724
Dec. 13, 1976 [JP] Japan ............................ 51-148725

[51] Int. Cl.$^2$ ........................ C23F 1/00; B32B 31/00
[52] U.S. Cl. .................................. 156/629; 156/153; 156/244.18; 156/244.19; 156/244.27; 156/212; 156/251; 156/322; 156/510; 156/515; 156/522; 156/553; 156/555; 156/582; 29/121.1; 428/421; 428/422
[58] Field of Search .............. 156/322, 251, 212, 555, 156/582, 153, 244.27, 244.19, 244.18, 553, 515, 516, 522, 510, 629; 428/421, 422; 29/121.1

[56] References Cited

U.S. PATENT DOCUMENTS

| | | | |
|---|---|---|---|
| 2,608,405 | 8/1952 | Salfisberg et al. | 29/121.1 X |
| 3,279,936 | 10/1966 | Forestek | 428/422 X |
| 3,453,165 | 5/1964 | Isbey et al. | 156/555 |
| 3,563,785 | 2/1971 | Toshisaburooga et al. | 428/422 X |
| 3,575,762 | 9/1969 | Goehring et al. | 156/322 |
| 4,005,157 | 1/1977 | Mattiussi et al. | 428/422 X |
| 4,036,668 | 7/1977 | Brandon | 156/153 |

Primary Examiner—John T. Goolkasian
Assistant Examiner—Lois E. Rodgers
Attorney, Agent, or Firm—Oblon, Fisher, Spivak, McClelland & Maier

[57] ABSTRACT

Lamination of plastic film and shaped metal substrates is carried out by a pair of rolls which comprises one heat-resistant roll having a hollow for receiving at least a forward edge of the shaped metal substrate, on at least one of the surfaces of the roll. A laminated product having no defect or crease of the plastic film can be obtained.

11 Claims, 7 Drawing Figures

METHOD OF LAMINATING PLASTIC FILM AND SHAPED METAL SUBSTRATES

BACKGROUND OF THE INVENTION

1. Field of the Invention

The present invention relates to a method of laminating a plastic film and shaped metal substrates. More particularly, it relates to a novel process, which can be applied for a mass production, for preparing valuable laminated shaped metal substrates including a plastic film having no defect or crease by melt-compressing the same between a pair of rolls which comprises at least one roll having a specific hollow.

2. Description of the Prior Art

Previously, coatings of a plastic on a metal substrate for imparting characteristics of anticorrosion, electric insulation, ornament, non-tacky and low friction have been applied in various fields. Various methods have been proposed for coating on metal plates, for example, the dispersion coating method using an aqueous or organic dispersion of plastic resin, the powder coating method using powdery plastic resin and the film laminating method coating a film of plastic resin have been proposed.

However, these conventional methods have certain disadvantages for a mass production of laminated products of shaped substrates such as discs.

The dispersion coating methods and powder coating methods can be applied for the mass production lines and these methods have been practically applied, however in order to form pin-holeless coated film, it is necessary to form thick coated film which is disadvantageous from an economical viewpoint. In order to form smooth coated film having uniform thickness, it is necessary to precisely control the coating operation and the curing operation whereby a complicated operation is disadvantageously required. In the case of the powder coating method, it is difficult to attain uniform coloring when an additive such as a pigment is simultaneously coated.

These disadvantages may be overcome by employing the film laminating method. When a film is laminated on a continuous ribbon type metal plate, no trouble occurs. However, in mass production of the shaped metal substrates, the following problems arise.

When the lamination is carried out by using a flat press machine, it is difficult to attain the lamination of thin film, productivity is remarkably low and the method is not applicable for mass production. When the lamination is carried out by the method of melt-compressing the film and the metal substrate between a pair of rolls which is usually employed for the lamination of a continuous ribbon type metal plate, the surfaces of the rolls are damaged by the edges of the shaped substrates. When the film, especially a thin film, is compressed on the substrate by the rolls having the defect, the same form of defect is caused on the laminated film to deteriorate the value of the laminated products. When a cookpot is prepared by a deep drawing, the disadvantages of peeling-off and damage to the film are caused at the defective part. When the shaped metal substrate has the shape of a circle, ellipsoid or triangle which contacts with the rolls in different widths, a crease is formed at a part of the laminated film in the conventional roll laminating method. The crease part is not bonded firmly on the metal substrate. When a cookpot is prepared by deep drawing the laminated metal substrate, the disadvantages of corrosion of the metal substrate and peel-off of the laminated film occur and the appearance of the value of the resulting product is inferior.

SUMMARY OF THE INVENTION

An object of the present invention is to provide a method of laminating a plastic film and shaped metal substrates which is suitable for mass-production.

Another object of the present invention is to provide a process for preparing a shaped metal substrate-plastic film laminated product which has no defect nor crease so as to have high value as goods.

Still another object of the present invention is to provide a process for preparing shaped metal substrate-plastic film laminated products which are suitable for preparing a container by a deep drawing so as to prevent corrosion of the metal substrate and peel-off of the film by extended use in a wet and hot atmosphere.

The foregoing and other objects of the present invention have been attained by providing a method of laminating a plastic film and shaped metal substrates wherein the shaped metal substrate is preheated at higher than the melt-flowable temperature of the plastic film and the plastic film is superposed on the shaped metal substrate and compressed by passing between a pair of rolls which comprises at least one roll having a hollow for receiving a forward edge of the shaped metal substrate to laminate them under receiving at least the forward edge of the shaped metal substrate in the hollow of the roll.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
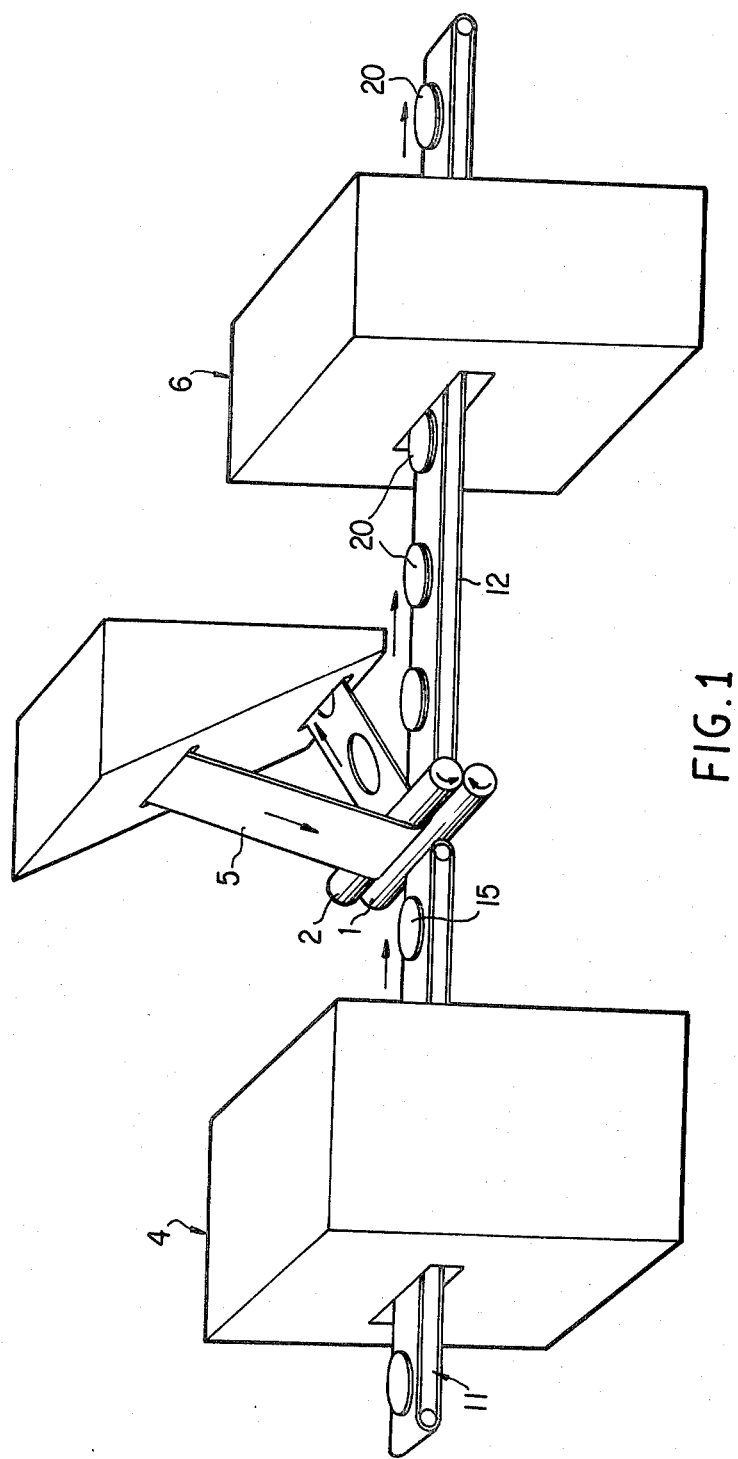
FIG. 1 show the process of the present invention.

As shown in FIG. 1 novel process for preparing a shaped metal substrate-plastic film laminated product 20 of the present invention comprises laminating a preheated shaped metal substrate 15 and the plastic film 5 between a pair of rolls 1, 2 which comprises at least one roll having a hollow 3 for receiving a forward edge of the shaped metal substrate under receiving at least the forward edge of the shaped metal substrate in the hollow of the roll. The shaped metal substrate should have the same shape.

The plastic films used in the present invention can be made of melt-processable thermoplastic resins such as polyethylene, polycarbonate, polyamide, polyvinyl chloride and polypropylene. From the viewpoints of characteristics of anticorrosion, non-adhesiveness, low friction, weather durability and electric insulation, it is preferable to use plastic films made of melt-processable fluorinated resins such as ethylene-tetrafluoroethylene copolymer, ethylene-trifluorochloroethylene copolymer, tetrafluoroethylene-hexafluoropropylene copolymer, tetrafluoroethylene-perfluorovinyl ether copolymer, vinylidene fluoride polymer and vinyl fluoride polymer.

The melt-processable fluorinated polymers have a volumetric melt flow rate of 10 to 300 mm$^3$/sec., preferably 25 to 160 mm$^3$/sec.

The term "volumetric melt flow rate" is defined as follows. 1 g of a sample of the polymer is extruded through a nozzle having a diameter of 1 mm and a land of 2 mm under a predetermined pressure of 30 kg/cm$^2$ at a predetermined temperature by using a Flow tester. The volume of the molten sample extruded per unit time is shown as the volumetric melt flow rate and the unit is mm$^3$/sec.

The optimum fluorinated polymers are ethylene-tetrafluoroethylene copolymers (referring to as ETFE) and ethylene-trifluorochloroethylene (referring to as ECTFE). The copolymers having a molar ratio of tetrafluoroethylene or trifluorochloroethylene to ethylene of 40:60 to 70:30 especially 45:55 to 60:40 and a volumetric melt flow rate of 10 to 300 mm$^3$/sec., especially 25 to 160 mm$^3$/sec., provide a laminated film advantageously having high adhesiveness and high strength.

The optimum ETFE and ECTFE has a melt flow initiation temperature of about 260° to 300° C. and about 220° to 260° C., respectively, as well as a thermal decomposition initiation temperature of about 320° to 360° C. and about 300° to 340° C., respectively.

The temperature in the measurement of the volumetric melt flow rate and the temperature for melt processing operation of the film or heating of the metal, substrate for the compressing operation and heating after the compressing operation is selected from the range of 260° to 360° C. in the case of ETFE and the range of 220° to 340° C. in the case of ECTFE.

These ETFE or ECTFE can comprise a small content of the other component such as propylene, isobutylene, vinyl fluoride, vinylidene fluoride, hexafluoroisobutylene, acrylic acid, alkyl acrylate, vinyl acetate, perfluoroalkyl vinyl ether, hexafluoroisobutyrene, and perfluoroalkyl ethylene or a modifier besides the main components of ethylene and tetrafluoroethylene or trifluorochloroethylene.

In the process of the present invention, the melt-processable thermoplastic resin is formed in a form of non-porous film before the lamination of the metal substrate.

The thickness of the nonporous film is not limited and is usually less than 500 microns. In the process of the present invention, even though a thin film having a thickness of less than 50 microns, such as 10 to 30 microns is used, suitable laminated film can be formed. It is possible to use a thick film. When the laminated product is processed in a deep drawing process or a bending process, disadvantageous problems are caused especially in commercial utilizations by using a thick film.

The non-porous film is advantageously prepared by an extrusion processing method under heating at higher than a melting point.

The advantageous results can be attained by using a film made of ETFE or ECTFE from the viewpoints of easy processing of the non-porous film and melt-processability on the metal substrate as well as the characteristics of the laminated product.

In the process of the present invention, a conveyor 11 can be used to transport the metal substrate 10 and it is important to preheat the metal substrate in a preheating zone 4 at higher than the melting point of the laminating thermoplastic film before the compressing step by the rolls 1, 2. When the temperature for the preheating is too low, the adhesion of the laminated film is not enough and the laminated film is easily peeled off. The temperature for the preheating zone 4 is selected depending upon the kind of the thermoplastic resin used. When the optimum ETFE or ECTFE is used, the temperature for preheating is selected from the before-mentioned ranges. The temperature for preheating is preferably about 5° to 100° C. higher than the melting point or melt-flowable temperature. When the temperature for preheating is too high, thermal degradation of the thermoplastic resin is disadvantageously caused, whereby it is selected from the range of lower than the thermal decomposition initiation temperature of the fluorinated polymer. From these viewpoints, it is preferable to select the temperature for preheating the metal substrate from the range of about 280° to 390° C. in the case of tetrafluoethylene-hexafluoropropylene copolymer and about 310° to 420° C. in the case of tetrafluoroethylene-perfluorovinyl ether copolymer and about 180° to 300° C. in the case of vinylidene fluoride polymer.

In the process of the present invention, it is important that the metal substrates have the same shape. The shape of the metal substrates is usually circular shaped such as discs, and can be shaped otherwise such as elliptic, triangular, rectangular and semi-circular shaped. When the shape of the metal substrates is the shape contacting with the roll under varying the contacting length at the moments, such as circular, elliptic and triangular shapes, the effect of the present invention is especially remarkable.

In the present invention, various kinds of materials can be used for the metal substrates, and should be durable at the temperature for preheating. From the viewpoints of various commercial usages, it is especially preferable to use aluminum based metals which include pure aluminum and various aluminum alloys such as duralumin and aluminum containing a small content of manganese or magnesium. In the present invention, it is also preferable to use the metal substrate made of iron based metals, copper based metals and titanium based metals such as stainless steels and mild steels.

It is preferable to apply a surface treatment on the surface of the metal substrates before the lamination. For example, it is preferable to apply a cleaning treatment for degreasing and the rough surface processing such as sand blasting and chemical etching of the surfaces of the metal substrates before the lamination of the non-porous film. The roughness of the surface is to be less than about 100 microns especially about 3 to 50 microns. The surface roughness of the rough surface is considered as the average roughness and it is less than the thickness of the non-porous film.

When the metal substrates made of the aluminum based metal which is the optimum in the present invention are used, it is preferable to use the metal substrates whose laminating surfaces are treated by electrolytic etching. In the electrolytic etching treatment, it is preferable to pass a DC current of higher than 1 coulomb/cm$^2$ in an aqueous solution of electrolyte comprising water soluble chloride. The adhesion strength improving effect of the compressing lamination of the present invention can be further improved by the electrolytic etching treatment. The treating operation, the conditions and the apparatus are not limited. Thus, it is preferable to provide masking on the part of no lamination with an insulator. In order to remove the resulting slime, it is effective for forming a luster laminated product to wash with water after the electrolytic etching treatment. The temperature of the electrolyte is preferably in a range of 30° to 80° C. Various water soluble chlorides can be used. Thus, it is suitable to use sodium chloride, potassium chloride and ammonium chloride from the viewpoints of the safety for human-body and cost. When the amount of electricity is too small, the adhesive strength improving effect is not enough, whereas when it is too excessive, the roughness of the surfaces of the metal substrates is too high and coloring is caused. Accordingly, such should be in a range of about 5 to 50 coulomb/cm$^2$ especially 10 to 40 coulomb/cm$^2$.

The laminated products having excellent adhesive strength can be obtained by combining the use of the aluminum based metal substrates whose surfaces are treated by the electrolytic etching and the compressing lamination of the nonporous film made of the specific fluorinated polymer.

In the present invention, it is preferable to use a rubber roll for at least one of the pair of rolls used for the compressing lamination and to feed the thermoplastic film in the side of the rubber roll. When metal rolls are used for both sides, it is difficult to apply uniform pressure whereby the laminated film having high durable adhesive strength is not easily obtained and the unadhered portions are increased disadvantageously.

In the present invention, a rubber roll is used in the side of the non-porous film, and the rubber roll can be also used in the side of the metal substrate. In the latter case, the damage of the rear surface on the metal substrate can be preferably prevented, whereby it is a preferable embodiment of the present invention. When a metal roll is used in the side of the non-porous film, it is difficult to apply uniform pressure on the laminated film even though the rubber roll is used in the side of the metal substrate. It is also preferable to use heat resistant rubbers such as silicone rubbers and fluorinated rubbers for the rubber roll.

Figure 2A:
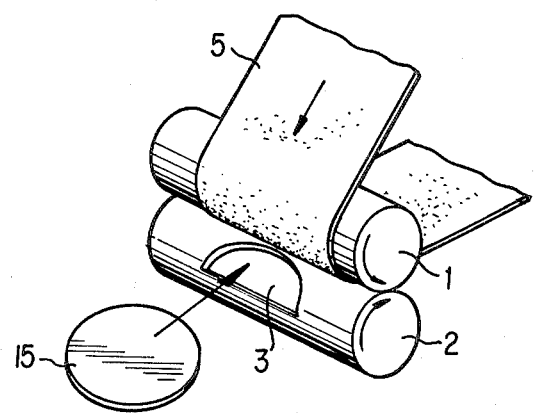
FIGS. 2A–2D show the positional relationship of various elements in operation.
Figure 2B:
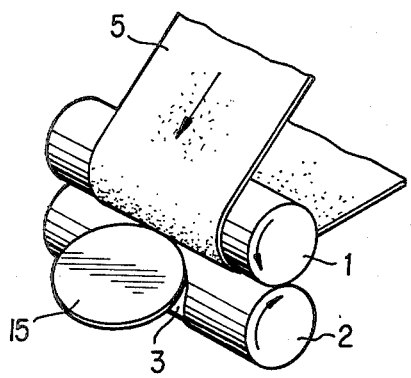
Figure 2C:
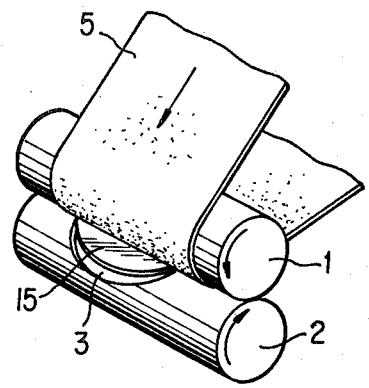
Figure 2D:
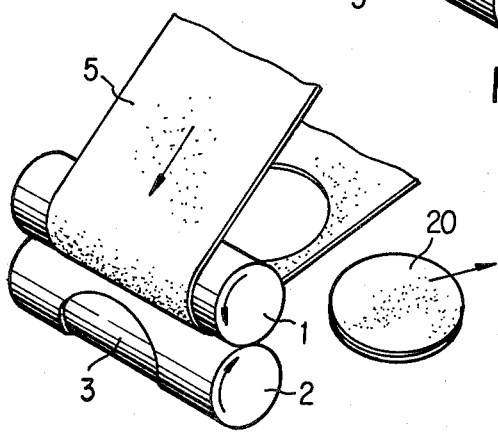

It is important to form a hollow 3 for receiving at least forward edges of the metal substrates on the roll surface at the part for contacting the forward edges of the metal substrates. As shown in FIGS. 2A-2D, the hollow can be formed on at least one of the pair of the rolls and the hollow can be also formed on both surfaces of the rolls. From the viewpoint of preventing creases, it is preferable to form the hollow on the roll which is contacted with the metal substrates. FIG. 2B shows the rolls 1, 2 at the start of a complete turn, FIG. 2C shows the same at half a turn and FIG. 2D shows a complete turn thereof.

Figure 3:
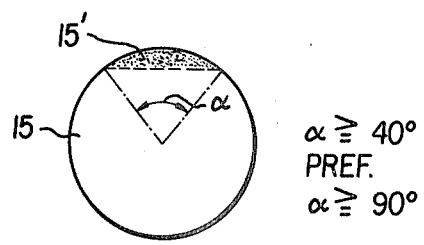
FIG. 3 shows a cross-section of a roll having a hollow.

The size of the hollow should be enough to receive, at least forward edge of the substrates. When the ratio of the area 15' of the substrate received in the hollow is higher, the prevention of creases is improved. For example, as shown in FIG. 3, when circular disc substrates are used, the size of the hollow should be enough to receive at least a segment surrounded by the chord and arc to subtend an angle α of 40 degrees. When the hollow is smaller, it is difficult to substantially prevent creases at the lamination of the film. When the hollow for receiving the segment surrounded by the chord and arc to subtend an angle of 90 degrees, the formation of creases can be substantially prevented. From the viewpoint of stable operation, it is preferable to form the hollow for receiving the whole part of the substrate. In this case, it is further preferable to provide suitable clearance between the substrate and the hollow.

When the clearance is too small, receiving of the substrates can not be smoothly attained whereas when the clearance is too large, creases are disadvantageously formed. In the case of circular disc substrates, it is preferable to provide a diameter of the hollow in a range of about 4 to 70 mm, preferably about 8 to 25 mm larger than those of the substrates.

At the lamination, it is preferable to provide a clearance of less than 10 mm, especially less than 3 mm at the forward edge of the substrates. Even though relatively a large clearance is formed at the rear part of the substrates, operation is not prevented. However, when relatively large clearance is formed at the forward edge, such causes the disadvantageous formation of creases.

Figure 4:
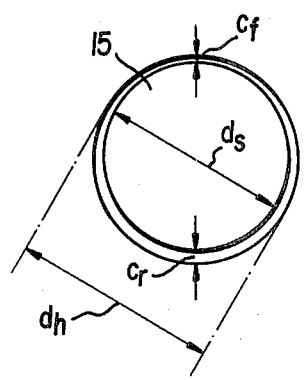
FIG. 4 shows the dimensional relationship of the substrate and hollow.

More particularly, where
dh: diameter of hollow
ds: diameter of substrate
cf: clearance at the forward edge of the substrates
cr: clearance at the rear edge of the substrates
the following conditions are to be met as shown in FIG. 4:

$$4 \text{ mm} \leq dh - ds \leq 70 \text{ mm}$$

preferably $$8 \text{ mm} \leq dh - ds \leq 25 \text{ mm}$$

preferably $$cf \leq 10 \text{ mm, and}$$

especially $$cf \leq 3 \text{ mm}.$$

When the clearances between the hollow and the substrates in both sides are the same as shown in FIG. 4, the following equations are given:

$$dh - ds = cf + cr$$

$$cr = (dh - ds) - cf$$

$$\therefore cr \leq 63 \text{ mm}$$

Accordingly, this corresponds to the passage even though a relatively large clearance is formed at the rear part of the substrates, operation is not prevented.

The depth of the hollow 3 depends upon the thickness of the substrates and the pressure at the lamination and it is preferable to provide the remainder given the depth of the hollow from the thickness of the substrates in a range of −1.5 mm to +1.5 mm, especially −1.0 mm to +0.8 mm. When the depth of the hollow is too great, the pressure required for the lamination is not enough or is not applied advantageously, whereas when the depth of the hollow is too thin, creases are caused.

When the hollow receiving all parts of the substrate is formed, it is possible to pass a rubber endless belt having hollows with a constant gap and a thickness corresponding to the depth between a pair of rolls without forming the hollow on the surface of the roll. The substrates are fitted in the hollows on the endless belt and the endless belt is passed between the pair of rolls whereby the same effect can be attained.

In the present invention, as the condition for the lamination, the feeding velocity is preferably in a range of 3 to 50 m/min., especially 5 to 40 m/min., and the pressure for compressing operation is preferably in a range of 0.3 to 15 kg/cm, especially 0.5 to 10 kg/cm. When the feeding velocity is slower, the creases are easily formed whereas when such is faster, or the pressure is lower, the adhesive strength is not high enough. When the pressure is higher, deterioration of the rubber roll is caused, disadvantageously. The pressure set forth above is for unit length (cm) in the axial direction of the roll.

It is important to control so as to dispose the substrates to the hollow on the surface of the roll. It is preferable to continuously feed the substrates at the same position in the hollow. The method of automatically controlling the rotation of the roll so as to stop the roll at the specific position or the method of synchronizing the velocity of the conveyor for feeding the substrates to the rolls to the revolutional velocity of the rolls for a desired period can be employed for said controlling method.

In the process of the present invention, the plastic film is continuously fed in ribbon form between a pair of rolls by directly feeding from an extruder or by winding up on a bobbin and feeding from a reel with the plastic film being punched by the action of the edge of the substrate as a cutter to cut the laminate part when the plastic film is passed on the rolls, and the remaining part is continuously wound up after passing the rolls. The remaining part is not contaminated with an adhesive composition whereby it can be fed to the extruder so as to pelletize it for reuse. Thus, from the viewpoint of productivity, it is preferable to reduce the remaining part which can be easily attained by reducing a difference between the maximum length in perpendicular to the feeding direction and the width of the film and a difference between integer times of the maximum length in the feeding direction and a difference of the length of circumference of the roll. When it is too small, the remaining part may snap under the strain. Accordingly, it is preferable to provide the difference of about 15 to 30 mm. When the length of circumference of the roll is set to be slightly larger than the maximum length in the feeding direction, one hollow is formed on the surface of the roll to laminate one of the substrates by one rotation. When the length of circumference of the roll is set to be slightly larger than double of the maximum length in the feeding direction, two hollows are formed on the surface of the roll so as to laminate two sheets of the film in one rotation.

In the present invention, suitable reinforcing material, filler, lubricant, stabilizer, pigment, adhesive strength improver and others can be incorporated in the film except deteriorating excellent characteristics such as adhesiveness, and melt processability. The thermal stability, surface hardness, mechanical strength, wearing resistance, non-adhesiveness and other characteristics can be improved by the addition of these additives.

In accordance with the process of the present invention, remarkable advantages can be attained in the case of coloring by the addition of a pigment or in the case of forming the laminated film containing suitable additive. When a pigment is added in a powder coating method, uniform coloring is not easily produced and the smoothness of the laminated film is deteriorated. On the other hand, it is easy to add a pigment in the preparation of the non-porous film and the non-porous film having a thickness of about 20 microns and uniform thickness and coloring can be easily prepared. For example, it is easy to prepare the film containing a suitable additive such as titanium oxide white pigment, carbon black pigment, titanium oxide carbon black grey pigment, chromium oxide, carbon fiber powder, glass fiber powder and alumina.

In the process of the present invention, it is possible to improve the adhesive strength of the laminated film by heating the laminated product obtained by the lamination at higher than the melting point of the thermoplastic resin. The temperature for the post heat treatment is selected from the range of the temperature for the preheating of the metal substrates before the lamination. The time for the post heat treatment in zone 6 is not limited and it can be selected depending upon the size of the laminated product, thickness of the non-porous film and temperature for the post heat treatment and is usually in a range of 1 to 30 minutes, preferably 1 to 15 minutes. Conveyor 12 serves to convey the laminated product 20 through the post treatment zone 6. The post heat treatment of the laminated product is effective for the aluminum based metal substrates treated by the special electrolytic etching equipment. Thus, when the specific electrolytic etching treatment is applied, high adhesive strength can be attained without the post heat treatment. When the metal substrates are treated by the rough surface treatment such as the sand blast treatment, the adhesive strength can be remarkably improved by the post heat treatment.

The laminated product prepared by the process of the present invention has a remarkably high adhesive strength of the laminated film whereby the deep drawing process and the bending process can be advantageously applied without trouble. For example, cookpots can be easily prepared from the laminated product by the deep drawing process. When the aluminum type metal substrates are used, the laminated product can be easily processed by the deep drawing process whereby commercial utilities of the laminated product are remarkably varied. Thus, in accordance with the process of the present invention, various laminated products such as electric parts, mechanical parts, construction parts, cooking wares and chemical apparatus can be prepared. The laminated products can be used in various fields for requiring high adhesive resistance, high heat resistance, high chemical resistance, smoothness, evenness, no-pinholes, and non-adhesiveness of the laminated films. The laminated products can be used for the heat resistant non-adhesiveness lamination for cooking wares and the stain resistant lamination for a cover of cooking range, etc.

Having generally described the present invention, a further understanding can be obtained by reference to certain specific examples which are provided herein for purposes of illustration only and are not intended to be limiting unless otherwise specified.

EXAMPLE 1

An ethylene-tetrafluoroethylene copolymer (a molar ratio of tetrafluoroethylene to ethylene of 53:47; a melt flow initiation temperature of 280° C.; a thermal decomposition initiation temperature of 350° C.; volumetric melt flow rate at 300° C. of 48 mm$^3$/sec.) was extruded by a heat melt extrusion to form a non-porous film having a thickness of 50 microns and a width of 470 mm.

One surface of the aluminum plate (purity of 99%) was treated by sand blasting to form a surface roughness of average depth of 10 to 15 microns and average pitch of 10 to 20 microns.

The rear surface (not receiving sand blasting treatment) of the aluminum plate was covered with a plate of vinyl chloride resin for masking and the sand blasted surface was treated by an electrolytic etching treatment with 3% aqueous solution of NaCl at 45° C. under a current density of 4 amp/dm², and a quantity of electricity of 20 coulomb/cm² and subsequently, the surface was washed with water and dried.

The treated aluminum plate was preheated at 320° C. and the non-porous film was superposed on the surface (etching treatment) and were compressed between a pair of rolls at a speed of 10 m/min, under a pressure of 1 kg/cm so as to laminate them. In operation, rubber rolls having a heat resistant silicone rubber linning and a length of 500 mm and an outer diameter of 142 mm were utilized. A circular hollow having a diameter of 435 mm and a depth of 1.8 mm in the expansion was formed on the surface of one of the rubber rolls. The lamination was carried out under the arrangement to directly received the aluminum disc in the hollow on the rubber roll whereby the laminated product having no crease could be obtained.

The resulting laminated product was heated at 320° C. for 10 minutes as the post heat treatment and subsequently, treated by a deep drawing process to form a cookpot having a depth of 144 mm and a diameter of 220 mm.

The cooking was repeated for 2000 times by using the cookpot. As the results, no corrosion nor peel-off of the film was found and the decrease of non-adhesiveness was not substantially found.

REFERENCE 1

In accordance with the process of Example 1, the lamination was carried out by using a pair of the rubber rolls having no hollow. As a result, a laminated product having creases of the film at the forward edge of the aluminum disc was produced.

EXAMPLE 2

In accordance with the process of Example 1, the lamination was carried out except using a plastic film made of ethylene-trifluorochloroethylene copolymer (a molar ratio of trifluorochloroethylene to ethylene of 50:50; a melt flow initiation temperature of 230° C. and a thermal decomposition initiation temperature of 300° C. and a volumetric melt flow rate at 275° C. of 100 mm³/sec.; a thickness of 20 microns and a width of 470 mm) and laminating at a preheating temperature of 300° C. under a pressure of 0.8 kg/cm and a temperature in a post heat treatment of 280° C. to obtain the laminated product which had high adhesive strength. In the peel-off test, the film was broken without peeling off.

EXAMPLE 3

In accordance with the process of Example 1, the lamination was carried out except using a plastic film made of tetrafluoroethyleneperfluoroalkoxyvinyl ether copolymer (a thickness of 50 microns; a width of 470 mm Teflon ® PFA film 200 LP manufactured by E. I. Dupont), and laminating at a preheating temperature of 410° C. and at a temperature in the post heat treatment of 390° C. to obtain the laminated product. The adhesive strength for peeling-off the film from the laminated product was 4.8 kg/cm.

EXAMPLE 4

In accordance with the process of Example 1, the lamination was carried out except using mild steel disc treated by a sand blasting treatment instead of the aluminum disc. The laminated product had no crease and had an adhesive strength for peeling-off of higher than 2 kg/cm. When the post heat treatment was not applied, the adhesive strength for peeling-off was lower than 0.5 kg/cm.

EXAMPLE 5

The ethylene-tetrafluoroethylene copolymer of Example 1 in a form of beads having an average diameter of 3 mm was blended to 20 to 30 wt.% of a mixed pigment of 99 wt. parts of titanium oxide fine powder and 1 wt.% part of carbon black fine powder. The resulting mixture was melt-extruded to prepare a pellet type master batch. The master batch was further blended to the ethylene-tetrafluoroethylene copolymer beads and the mixture was extruded to obtain pellets containing 3 to 5 wt.% of the pigments. The pellets were melt extruded by an extruder having a die temperature of 290° to 310° C. to prepare a grey non-porous film having a thickness of 20 microns.

In accordance with the process of Example 1, the lamination was carried out except using the resulting film. The resulting film of the laminated product had no crease, was uniformly colored and was smooth.

REFERENCE 3

The mixed pigments of Example 5 were blended to the ethylene-tetrafluoroethylene copolymer of Example 1 having an average diameter of 20 microns at a ratio of 3 to 5 wt.% of the pigments.

The aluminum disc treated by the electrolytic etching treatment of Example 1 was coated by the electrostatic powder coating method with the mixture of the pigments and the copolymer. As the result, when the thickness of the coated film was 20 microns, the surface was remarkably rough and a smooth coated film could not be formed.

EXAMPLE 6

An aluminum disc having a thickness of 1.2 mm and a diameter of 440 mm which was treated by the electrolytic etching method, was preheated at 350° C. and lamination was carried out by feeding it with a film of tetrafluoroethylene and hexafluoropropylene copolymer having a thickness of 50 microns (Teflon ® FEP film 200° C.; manufactured by E. I. Dupont.) between a pair of rubber rolls.

On the lower roll, a hollow was formed so as to form a segment (the arc subtend an angle of 45 degree and the diameter of the corresponding circle is 460 mm) the hollow had tapered depth wherein the depth at arc was 0.8 mm and the depth at chord was 0.

The forward edge of the aluminum disc was received in the hollow of the roll and the lamination was carried out under a pressure of 5 kg/cm. The resulting laminated product had no crease.

Obviously, many modifications and variations of the present invention are possible in light of the above teachings. It is therefore to be understood that within the scope of the appended claims the invention may be practiced otherwise than as specifically described herein.

What is claimed is:

1. A method of laminating a plastic film and shaped metal substrates utilizing a pair of rollers, said pair of rollers comprising at least one heat resistant roll having a hollow, the depth of which is equal to the thickness of said substrate ±1.5 mm, capable of receiving at least a forward edge of the shaped metal substrates, said method comprising:

treating the surface of the shaped metal substrates such that surface roughness of the surface is less than 100 microns;

preheating the shaped metal substrates, the upper limit of the preheating temperature being set lower than thermal decomposition initiation temperature of the plastic film and the lower limit being set 5°–100° C. higher than the melting point or melt flowable temperature;

melt bonding the plastic film on the shaped metal substrates by passing said shaped metal substrates together with said plastic film, under compression, between said pair of rolls wherein clearance at the forward edge between the hollow and the shaped metal substrates is greater than 0 mm and less than 10 mm; and contacting the shaped metal substrates, all of which are the same shape with uniformly varying widths, with the rolls whereby the plastic film is cut by the edge of the shaped metal substrates.

2. A method according to claim 1 wherein the shaped metal substrates have a circular shape and the hollow has a shape for receiving a segment of said circular shaped metal substrate defined by a chord and an arc subtending an angle of more than 40 degrees.

3. A method according to claim 1 wherein said hollow is capable of receiving the entire surface of the shaped metal substrates therein.

4. A method according to claim 1 wherein the plastic film comprises melt-processable fluorinated polymer.

5. A method according to claim 4 wherein the fluorinated polymer comprises ethylene-tetrafluoroethylene copolymer having a molar ratio of tetrafluoroethylene component to ethylene component of 40:60 to 70:30.

6. A method according to claim 4 wherein the fluorinated polymer comprises ethylene-trifluorochloroethylene copolymer having a molar ratio of trifluorochloroethylene component to ethylene component of 40:60 to 70:30.

7. A method according to claim 1 wherein the shaped metal substrates comprise aluminum.

8. A method according to claim 1 wherein the roller on the side contacting the plastic film comprises a rubber roller.

9. A method according to claim 1 wherein the melt bonding is carried out at a feeding velocity of 3 to 50 m/min under a pressure of 0.5 to 10 kg/cm$^2$ between the pair of rollers.

10. A method according to claim 1, further comprising disposing a heat resistant rubber lining on each of the pair of rollers.

11. A method according to claim 1 wherein the shaped metal substrates comprise aluminum based alloy.

* * * * *